US010275219B2

(12) United States Patent
Almagambetov et al.

(10) Patent No.: US 10,275,219 B2
(45) Date of Patent: Apr. 30, 2019

(54) BIT-SERIAL MULTIPLIER FOR FPGA APPLICATIONS

(71) Applicant: Embry-Riddle Aeronautical University, Inc., Daytona Beach, FL (US)

(72) Inventors: Akhan Almagambetov, Rochester, NY (US); Holly Renee Ross, Oro Valley, AZ (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 36 days.

(21) Appl. No.: 15/807,147

(22) Filed: Nov. 8, 2017

(65) Prior Publication Data

US 2018/0129475 A1    May 10, 2018

Related U.S. Application Data

(60) Provisional application No. 62/419,245, filed on Nov. 8, 2016.

(51) Int. Cl.
| | |
|---|---|
| *G06F 7/52* | (2006.01) |
| *G06F 7/525* | (2006.01) |
| *G06F 7/504* | (2006.01) |
| *G06F 7/48* | (2006.01) |
| *G06F 13/42* | (2006.01) |
| *G06F 13/40* | (2006.01) |

(52) U.S. Cl.
CPC .............. *G06F 7/52* (2013.01); *G06F 7/4824* (2013.01); *G06F 7/504* (2013.01); *G06F 7/525* (2013.01); *G06F 13/4022* (2013.01); *G06F 13/4282* (2013.01); *G06F 2207/481* (2013.01)

(58) Field of Classification Search
CPC ....................................................... G06F 7/525
See application file for complete search history.

(56) References Cited

U.S. PATENT DOCUMENTS

| | | |
|---|---|---|
| 3,610,907 A | 10/1971 | Taylor |
| 3,670,956 A | 6/1972 | Calhoun |
| 3,805,043 A | 4/1974 | Clary |
| 4,839,847 A | 6/1989 | Laprade |
| 4,860,240 A | 8/1989 | Hartley et al. |

OTHER PUBLICATIONS

Lee, Jae-Jin, "Bit-level Systolic Array for FIR Filter using AND-based Bit-serial Multiplier", Tencon, (2003), 87-90.

*Primary Examiner* — Chuong D Ngo
(74) *Attorney, Agent, or Firm* — Schwegman Lundberg & Woessner, P.A.

(57) ABSTRACT

A Field-Programmable Gate Array (FPGA) implementation of a multiplier topology can provide a considerable increase in computation performance and cost benefit as compared to other approaches, particularly for large bit widths (e.g., for multiplication of large-bit numbers). A lack of sufficient input/output (I/O) ports on the FPGA for a particular bit width can be remedied by implementing large-bit number multiplications in a bit-serial fashion. The bit-serial multiplier topologies described herein can provide a relatively small footprint as compared to other approaches. An FPGA-implemented bit-serial multiplier can improve operation of a computing system, for example, by offloading binary multiplication operations from a general-purpose processor.

20 Claims, 15 Drawing Sheets

|     |     |     | MSB |     |     | LSB |     |
|-----|-----|-----|-----|-----|-----|-----|-----|
|     |   × |     | $a_3$ | $a_2$ | $a_1$ | $a_0$ |     |
|     |     |     | $b_3$ | $b_2$ | $b_1$ | $b_0$ |     |

$$
\begin{array}{rccccccccl}
  &       &       &       & a_3b_0 & a_2b_0 & a_1b_0 & a_0b_0 & pp_0 \\
  &       &       & a_3b_1 & a_2b_1 & a_1b_1 & a_0b_1 &        & pp_1 \\
+ &       & a_3b_2 & a_2b_2 & a_1b_2 & a_0b_2 &        &        & pp_2 \\
  & a_3b_3 & a_2b_3 & a_1b_3 & a_0b_3 &        &        &        & pp_3 \\
\hline
p_7 & p_6 & p_5 & p_4 & p_3 & p_2 & p_1 & p_0 &
\end{array}
$$

FIG. 3

|   |   | MSB |   |   | LSB |   |   |
|---|---|---|---|---|---|---|---|
| × |   | $a_3$ | $a_2$ | $a_1$ | $a_0$ |   |   |
|   |   | $b_3$ | $b_2$ | $b_1$ | $b_0$ |   |   |

|   |   |   |   | $a_3b_0$ | $a_2b_0$ | $a_1b_0$ | $a_0b_0$ | $pp_0$ |
|---|---|---|---|---|---|---|---|---|
| + |   | ○ | $a_3b_1$ | $a_2b_1$ | $a_1b_1$ | $a_0b_1$ | ○ | $pp_1$ |
|   |   | $a_3b_2$ | $a_2b_2$ | $a_1b_2$ | $a_0b_2$ | ○ | ○ | $pp_2$ |
|   | ○ | $a_3b_3$ | $a_2b_3$ | $a_1b_3$ | $a_0b_3$ | ○ | ○ | $pp_3$ |

| FPGA | Design[2] | | Control Sets (CS) | | | Slices | | LUT as Logic | | LUT Available | LUT-FF Pairs | | |
|---|---|---|---|---|---|---|---|---|---|---|---|---|---|
| | | | Unique CS | Reg$_{min}$ CS | Lost to Restrict. | Used | Avail. | O6[3,4] | O5+O6 | | LUT+FF | LUT[4] | FF[4] |
| | | | | | | | | Total | | | Total | | |
| XC6SLX16[1] Spartan 6 (MityDSP) | Optimized | P | 2 | 7 | | 1,528 (8.38%) | 18,224 | 1,616 | 50 | 9,112 | 981 | 782 | 411 |
| | | | | | | | | 1,666 (18.28%) | | | 2,174 (23.86%) | | |
| | | C | 257 | 1,793 | | 1,023 (5.61%) | | 320 | 97 | | 328 | 112 | 602 |
| | | | | | | | | 417 (4.58%) | | | 1,042 (11.44%) | | |
| | Unopt. | P | 1 | 3 | | 1,533 (8.41%) | | 1,637 | 47 | | 1,031 | 760 | 358 |
| | | | | | | | | 1,684 (18.48%) | | | 2,149 (23.58%) | | |
| | | C | 257 | 1,793 | | 1,023 (5.61%) | | 320 | 97 | | 497 | 48 | 376 |
| | | | | | | | | 417 (4.58%) | | | 921 (10.11%) | | |
| XC7A35T Atrix 7 (Basys3) | Optimized | P | 1 | 7 | | 449 (5.51%) | 8,150 | 1,242 | 162 | 20,800 | 1,013 | 391 | 129 |
| | | | | | | | | 1,404 (6.75%) | | | 1,533 (7.37%) | | |
| | | C | 257 | 1,793 | | 402 (4.93%) | | 182 | 170 | | 320 | 32 | 466 |
| | | | | | | | | 352 (1.69%) | | | 818 (3.93%) | | |
| | Unopt. | P | 1 | 3 | | 450 (5.52%) | | 1,245 | 163 | | 1,025 | 383 | 121 |
| | | | | | | | | 1,408 (6.77%) | | | 1,529 (7.35%) | | |
| | | C | 257 | 897 | | 7,790 (95.58%) | | 179 | 171 | | 320 | 30 | 23,541 |
| | | | | | | | | 350 (1.68%) | | | 23,891 (114.86%)[5] | | |
| XC7VX485T Virtex 7 (VC707) | Optimized | P | 1 | 7 | | 481 (0.63%) | 75,900 | 1,242 | 162 | 303,600 | 1,012 | 392 | 135 |
| | | | | | | | | 1,404 (0.46%) | | | 1,539 (0.51%) | | |
| | | C | 257 | 1,793 | | 401 (0.53%) | | 182 | 170 | | 319 | 33 | 462 |
| | | | | | | | | 352 (0.12%) | | | 814 (0.27%) | | |
| | Unopt. | P | 1 | 3 | | 484 (0.64%) | | 1,245 | 163 | | 1,035 | 373 | 128 |
| | | | | | | | | 1,408 (0.46%) | | | 1,536 (0.51%) | | |
| | | C | 257 | 897 | | 9,136 (12.04%) | | 179 | 171 | | 301 | 49 | 25,164 |
| | | | | | | | | 350 (0.12%) | | | 25,514 (8.40%) | | |
| XC7K325T Kintex 7 (KC705) | Optimized | P | 1 | 7 | | 472 (0.93%) | 50,950 | 1,242 | 162 | 203,800 | 1,023 | 381 | 130 |
| | | | | | | | | 1,404 (0.69%) | | | 1,534 (0.75%) | | |
| | | C | 257 | 1,793 | | 407 (0.80%) | | 182 | 170 | | 328 | 24 | 477 |
| | | | | | | | | 352 (0.17%) | | | 829 (0.41%) | | |
| | Unopt. | P | 1 | 3 | | 479 (0.94%) | | 1,245 | 163 | | 1,019 | 389 | 136 |
| | | | | | | | | 1,408 (0.69%) | | | 1,544 (0.76%) | | |
| | | C | 257 | 897 | | 9,487 (18.62%) | | 177 | 172 | | 316 | 33 | 25,596 |
| | | | | | | | | 349 (0.17%) | | | 25,945 (12.73%) | | |

[1] Implemented using Xilinx ISE 14.7 System Edition.
    Xilinx Vivado 2015.4 System Edition otherwise.
[2] Legend: P—proposed, C—comparative approach.
[3] There are no instances of only the O5 output being used.
[4] Only.
[5] Overmapped. Implementation on device not possible

FIG. 11

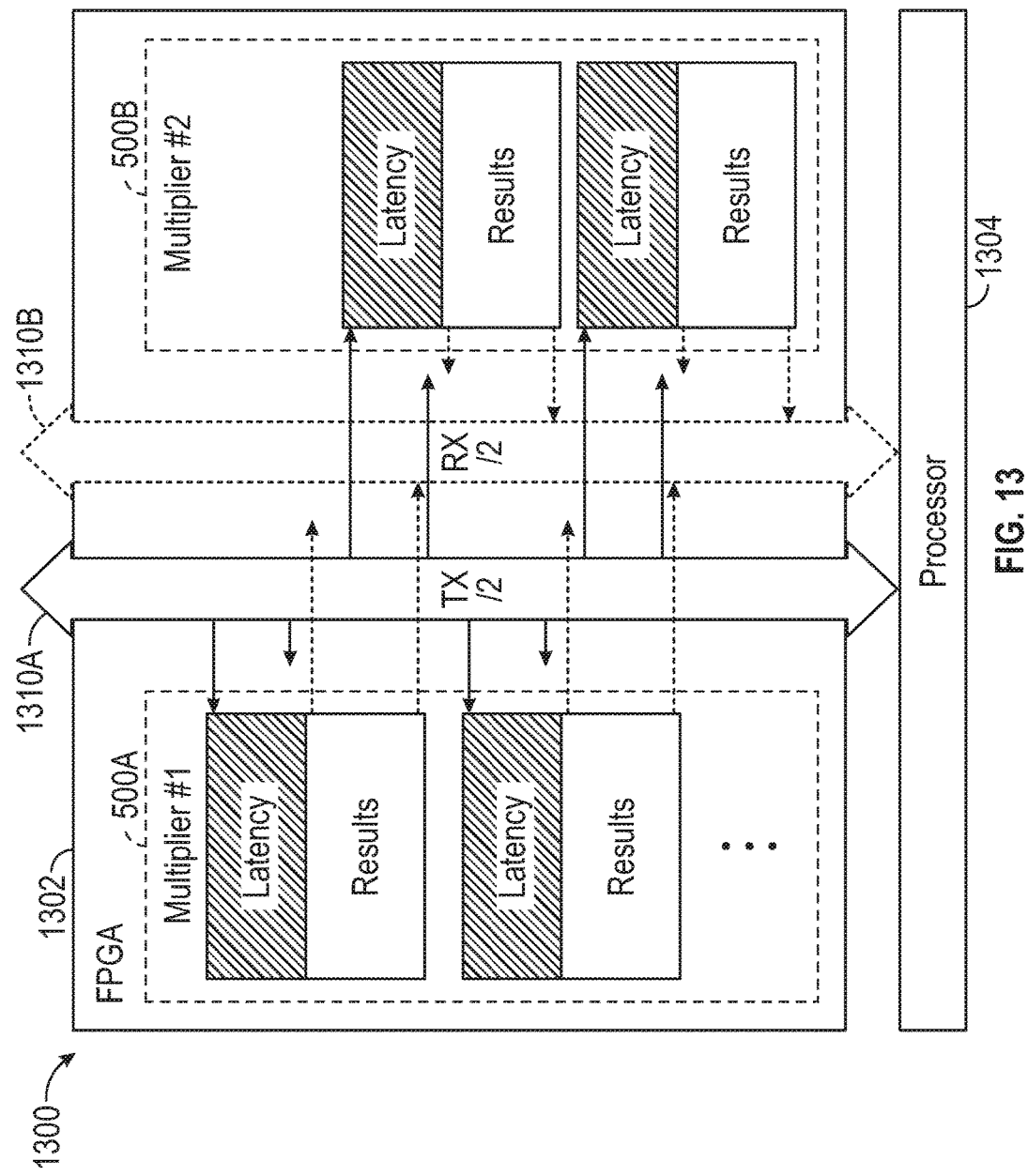

BIT-SERIAL MULTIPLIER FOR FPGA APPLICATIONS

CLAIM OF PRIORITY

This patent application claims the benefit of priority of Almagambetov et al., U.S. Provisional Patent Application No. 62/419,245, titled "BIT-SERIAL MULTIPLIERS FOR FPGA APPLICATIONS," filed on Nov. 8, 2016 which is hereby incorporated by reference herein in its entirety.

TECHNICAL FIELD

This document pertains generally, but not by way of limitation, to multiplier logic circuit topologies, and in particular to bit-serial multiplier circuits that can be implemented at least in part using a Field-Programmable Gate Array (FPGA) device or another programmable logic device, or implemented using an Application Specific Integrated Circuit (ASIC).

BACKGROUND

Various bit-serial multiplier circuit topologies may consume a large number of flip-flops, which generally translates into a large physical footprint when such circuits are implemented using a Field-Programmable Gate Array (FPGA) device. This can occur because "slices" of the FPGA device where a flip-flop is used, but where accompanying combinational logic may not be required, are deemed "occupied" and the associated look-up tables (LUTs) on such slices may not then otherwise be available for use. Additionally, some circuit topologies may consume a large area due to a larger number of control sets. Generally-available serial multiplier implementations can be inefficient in terms of a number of clock cycles consumed per multiply operation, or such approaches may not start generating a partial result immediately (each of these considerations can pose a serious computational bottleneck). Another approach can include use of a hybrid bit-serial/parallel multiplier implementation, but such an approach can be inefficient in terms of consuming input/output facilities on the FPGA device, such as consuming excess pins on the device package.

SUMMARY

Digital multipliers can be used in a variety of applications, such as the implementation of neural networks, use in cryptography (e.g., including encryption algorithms), or use in a broad range of other applications. For example, other applications can include system simulation (including control system analysis using state-space matrices), outcome prediction, or digital signal processing (DSP), more generally. In such applications, a large-bit multiplication facility can be desirable, with good scalability and ease of implementation.

The present inventors have recognized, among other things, that using a Field-Programmable Gate Array (FPGA) circuit implementation can provide a considerable increase in computation performance and cost benefit as compared to other approaches, particularly for large bit widths (e.g., for multiplication of large-bit numbers). The present inventors have also recognized, among other things that a problem of insufficient input/output (I/O) ports on an FPGA circuit can be addressed by implementing large-bit number multiplications in a bit-serial fashion. The bit-serial multiplier topologies described herein can provide a relatively small footprint as compared to other approaches, when implemented using an FPGA circuit. The examples described herein are highly scalable, such as supporting the multiplication of numbers of arbitrary length by replicating certain blocks in the topology, which enables use of electronic design automation tools to easily scale the topology. An FPGA-implemented bit-serial multiplier can improve operation of a computing system, for example, by offloading binary multiplication operations from a general-purpose processor.

For the illustrative examples described herein, a number of clock cycles defining a duration to multiply two "n"-bit numbers can be n, with a latency (e.g., a duration, when no results or partial results are output) of n−3 (e.g., to provide total time to output result of 2n−3), which represents a major improvement as compared to other approaches, because the result is generated in n clock cycles and pipelining can be used to stagger the multiplication operations on two or more multipliers in order to eliminate the effect of latency. The examples described herein can also start producing a partial result almost immediately (e.g., such as having a latency of no more than one clock cycle, according to an illustrative example), without requiring a wait for data to become fully available. This can be useful for applications such as computationally intensive simulations.

In an example, a system or a portion of a system can include a general-purpose processor circuit and a field-programmable gate array (FPGA) circuit coupled to the general-purpose processor circuit to serially receive a binary multiplicand and a binary multiplier and to provide a result of a bit-serial multiplication performed on the binary multiplicand and the binary multiplier. The FPGA circuit can be configured to perform the bit-serial multiplication using a bit-serial multiplication circuit, the performing the bit-serial multiplication including: serially receiving the binary multiplicand, serially receiving the binary multiplier, and contemporaneously during the serially receiving, providing two bits comprising the least significant bit and the second least significant bit of the result of the multiplication.

In an example, a method can include serially receiving a binary multiplicand, serially receiving a binary multiplier, contemporaneously during the serially receiving the binary multiplicand and the binary multiplier, providing two bits comprising the least significant bit and the second least significant bit of the result of the multiplication. The method can be performed using a system comprising digital circuitry including field-programmable gate array (FPGA) circuit configured to provide a bit-serial multiplication circuit.

In an example, a system can include a means for serially receiving a binary multiplicand, such as serial input port, a means for serially receiving a binary multiplier, such as using the same serial input port or another serial input port, and a means for contemporaneously during the serially receiving the binary multiplicand and the binary multiplier, providing two bits comprising the least significant bit and the second least significant bit of the result of the multiplication using an FPGA circuit, such as an FPGA circuit configured to provide a bit-serial multiplier circuit. In an example, the system can include a means for receiving instructions to configure the FPGA circuit to provide the bit-serial multiplication circuit to perform the bit-serial multiplication, such as a programming input coupled to a memory circuit separate from the FPGA circuit, or a memory circuit located internally within an FPGA circuit package.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIG. 3 illustrates generally an example of multiplication of two numbers represented as a binary multiplicand and a binary multiplier

FIG. 6 illustrates generally a technique for generation of 2-bit partial product groups, such as to provide a result from multiplying a 4-bit binary multiplicand and a 4-bit binary multiplier to provide a multiplication result.

FIG. 11 is an illustrative example comprising a table showing a comparison in FPGA resource utilization for the illustrative examples of bit-serial multiplier topologies shown in FIG. 5 and FIG. 8, respectively.

FIG. 13 illustrates generally an example of a portion of a system, such as can implement a data serialization scheme where a general purpose processor circuit can provide a binary multiplicand and a binary multiplier to provide a multiplication result to one or more FPGA-implemented multiplier circuits, and the general-purpose processor circuit can receive results from the one or more FPGA-implemented multiplier circuits.

Figure 1A:
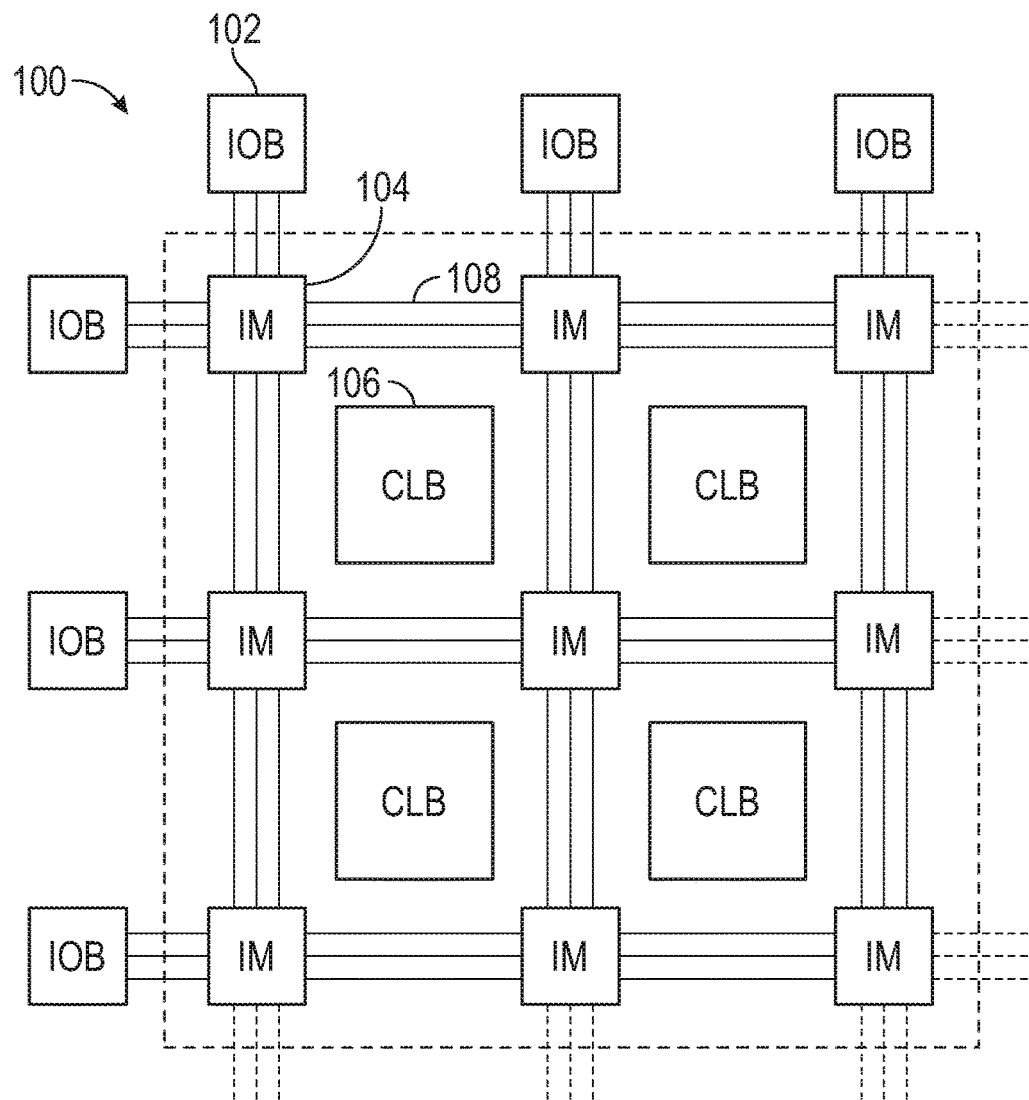
FIG. 1A illustrates generally an internal architecture of an illustrative example comprising an FPGA.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A proliferation has occurred where neural networks are used in various aspects of modern engineering ranging from system simulation and outcome prediction to encryption techniques and Digital Signal Processing (DSP) applications as illustrative examples. In such applications, large-bit number multiplication may be used. A digital multiplication facility can be implemented at least in part using Field Programmable Gate Array (FPGA) devices. For example, using dedicated FPGA-based hardware for computationally intensive operations can provide a considerable increase in computation performance and cost benefit can be achieved for operations involving multiplication of large-bit numbers.

Use of FPGA circuits can present challenges. For example, an insufficient number of input/output (I/O) pins present on FPGA devices can preclude use of parallel large-bit multiplication topologies. Another challenge can include that FPGA circuits generally constrain a number of available logic blocks that can be used for implementation of the multiplier. In one approach, FPGA circuit routing optimization can be performed, such as using statistical or other methods to maximize the logic block utilization, while working under a constraint of insufficient available I/O pins. However, such an approach can still have limitations. For example, parallel implementations of large-bit mathematical operations generally cannot support having an individual pin assigned to every bit of the input. As such, inputs to the multiplier are generally multiplexed or managed via some parallel-serial hybrid implementation to reduce the hardware complexity. But, such hybrid implementations may also "waste" a large number of FPGA logic blocks for extra flip-flops that can be used to provide the multiplier circuitry with input bits in the correct order.

The modifier "bit-serial," when applied to arithmetic circuit implementations, can generally refer to the manner in which the operands for the arithmetic operation are processed. In certain approaches, one operand can be processed serially, while the other operate need not be processed serially. The modifiers "serial-parallel" and "serial-serial" can be used as a means of distinguishing an exclusively serial architecture from a "hybrid" or partially-serial architecture. In this patent document, a generic, bit-serial multiplier is described. The bit-serial multiplier described herein is serial-serial in that both operands are processed serially and the class of system implementations that it is compared against are systems where both operands are treated bit-by-bit. Generally, the phrase "bit-serial" applies to those systems where all arithmetic operands are processed serially (though not necessarily output serially), and the phrase "serial-parallel" is applied to architectures where only one operand is processed bitwise.

Programmable logic devices (PLDs) and programmable array logic (PAL) devices have been generally available since the early-1970s and 1980s, respectively. The introduction of power-efficient and easy-to-customize FPGAs in 1985 by Xilinx, Inc. (San Jose, Calif., United States of America; hereinafter "Xilinx") promoted widespread use of customizable programmable glue-logic-based devices. FPGA circuits generally provide a readily modifiable hardware configuration that does not need to go through the lengthy process of fabrication, unlike Application-Specific Integrated Circuits (ASIC). FPGA devices can be used for testing and implementing novel logic topologies. In the illustrative examples described herein, a number of FPGA devices from Xilinx are used for realization of such examples. The selected devices provide an ample amount of internal resources and I/O facilities for current implementation examples and can operate at high frequencies.

Figure 1B:
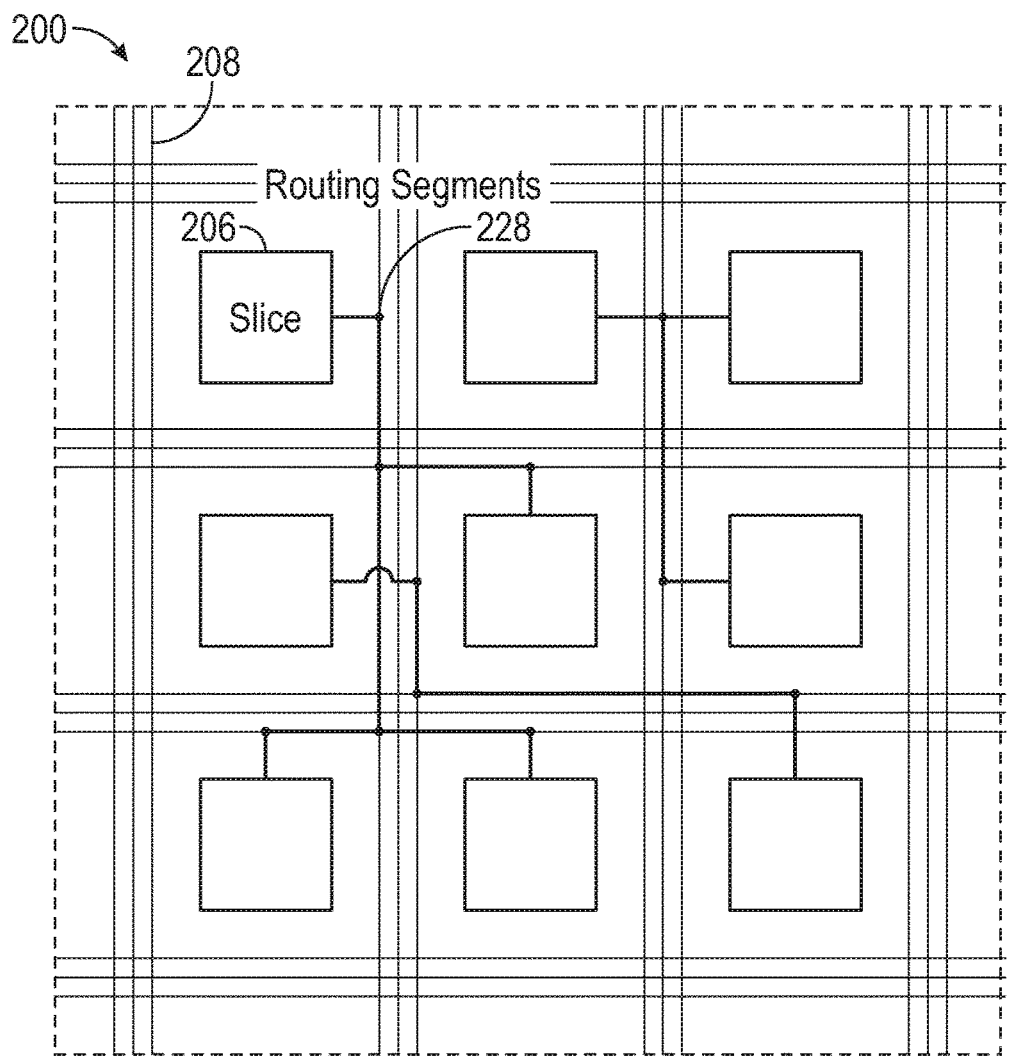
FIG. 1B illustrates generally another representation of an internal architecture of an illustrative example comprising an FPGA.

FIG. 1A illustrates generally an internal architecture of an illustrative example 100 comprising an FPGA circuit and FIG. 1B illustrates generally another representation of an internal architecture of an illustrative example 200 comprising an FPGA circuit. FPGA devices can include circuits having different structure, such as having internal electrically-erasable or erasable programmable read-only memory ((E)EPROM), static random access memory (SRAM), fuse, and anti-fuse-based topologies. Despite such variations, FPGA internal device architectures can be generally similar to the illustrative examples 100 and 200 of FIG. 1A and FIG. 1B. For example, FIG. 1 shows an example 100 that can include at least one input/output block (IOB) 102, such as can be routed to a programmable interconnect multiplexer (IM) 104. The IM 104 can be coupled to other IMs such as using an interconnect routing segment 108. A configurable logic block (CLB) can be coupled to one or more IMs, such as by establishing a connection to one or more interconnect routes.

Referring to the example 200 of FIG. 1B, routing segments such as a routing segment 208 can be located at or nearby one or more slices, such as a slice 206. Generally, a low-level logic block of any type within an FPGA can be referred to as a "slice," 206 although different manufacturers sometimes refer to such basic logic blocks by other names. A typical slice 206 can include, as an illustrative example, a 4- or 6-input look-up table (or LUT), which can be used for combinational logic needs within the device, coupled with a a flip-flop that is connected to the LUT a multiplexer. The slices are either connected to or disconnected from the circuit via "routing segments," such as nets connected to the "routing switches" that can be configured to connect or disconnect a particular routing segment to provide a particular circuit topology. An illustrative example of a routing matrix is shown in FIG. 1B. Slices can be programmatically coupled to routing segments, such as shown at a coupling 228 (e.g., using switch structures internal to the FPGA of the examples 100 or 200).

FPGA circuits offer flexibility because of their programmability after the manufacturing process is complete (hence the phrase "field programmable," referring to the ability to program FPGA devices after they depart the manufacturing facility). Conversely, in an ASIC device, individual devices and interconnects are generally permanently established at fabrication, during the manufacturing process. ASIC functions are generally optimized for specific applications and remain static through the life of the chip; aside from use of general-purpose processor blocks, circuit function of an ASIC cannot be changed once an ASIC is designed and produced. While the examples herein can be realized using an FPGA, such examples can also be implemented as functional blocks of an ASIC or other device. FPGAs can act as a "stepping stone" toward ASIC development for applications with strict power requirements, as FPGAs typically consume more than twice the power required for the operation of an ASIC.

Figure 2:
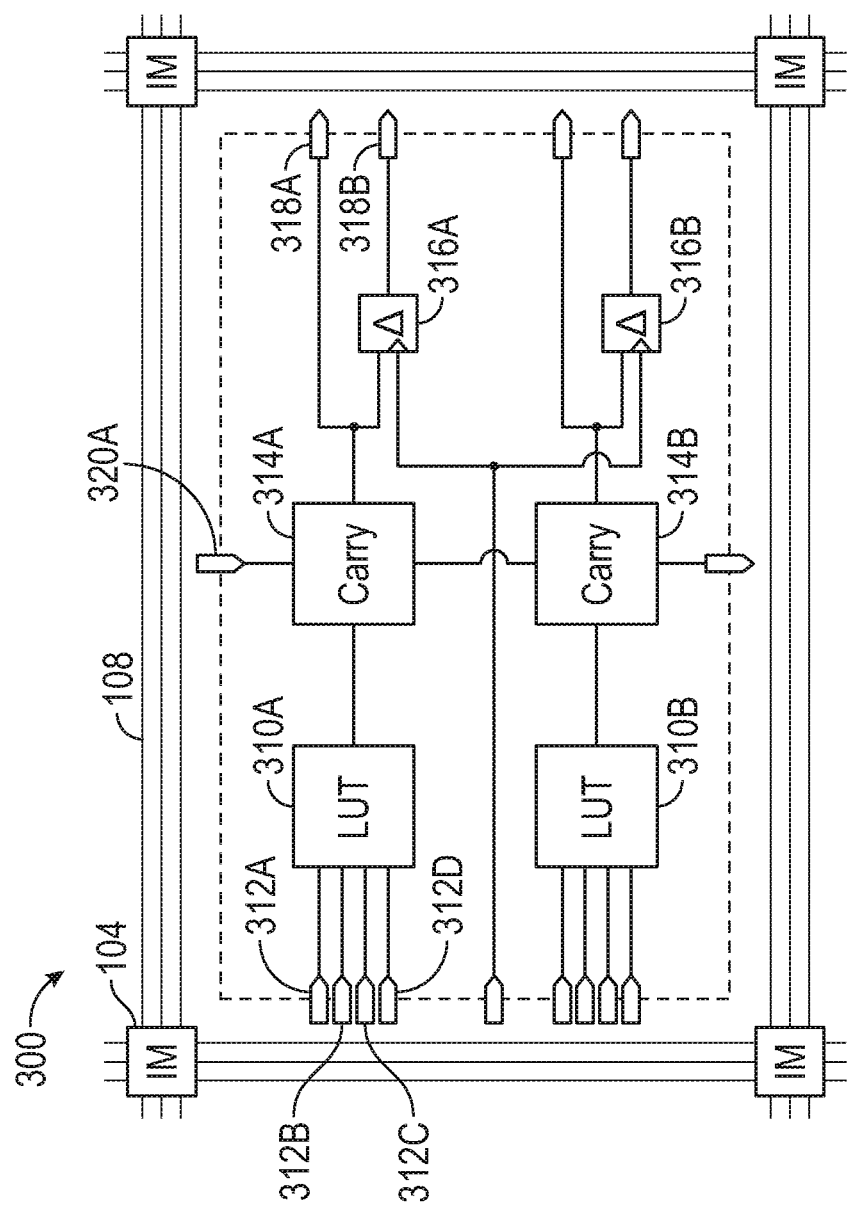
FIG. 2 illustrates generally a generalized representation of a configurable logic block (CLB) such as can be included as a portion of an FPGA.

Generally-available FPGAs can include "multi-slice logic blocks," such as containing more than one LUT and flip-flop per slice. This approach can be taken to cater to functionality related to higher-complexity circuit configurations. In the illustrative example here. Referring to the table of FIG. 11, a count of LUTs and flip-flops are shown that are roughly twice a count of slices (a feature of the Spartan 3E FPGA mentioned elsewhere). An illustrative example 300 of a configuration of a multi-slice logic block is shown in FIG. 2, and can be referred to as a Configurable Logic Block, or CLB, such as can be included as a portion of an FPGA. The example 300 of FIG. 2 shows elements of a CLB such as can be coupled to one or more routing segments 108, which can then be coupled elsewhere such as using an IM 104 as mentioned above. The CLB can include inputs 312A, 312B, 312C, 312D, such as coupled to a LUT 310A.

The LUT 310A can either feed out of the slice to an output 318A or into a register 316A. A carry-operation block 314A can be included such as to provide a carry input 320A. Registers can also be referred to as flip-flops, or FFs. FFs are time-based elements and are fundamental elements of all clock-based circuits. The flip-flops can support clock enable and asynchronous set and reset functionality, according to various examples. There are many different potential configurations for flip-flops, and some implementations are specific to a particular manufacturer FPGA device family.

In order to support higher-level functional blocks, slices may be grouped together by the manufacturer, forming a larger structure. For example, FIG. 2 illustrates generally a grouping of slices forming a larger structure, where the CLB includes a second LUT 310B, a second carry-operation block 314B such as having a carry output, and a second register 316B. The nomenclature, architecture, features and sizes of these larger blocks can vary between supplier, family, and device. Some example of names for these combined logic block groups can include: tile, configurable logic block (CLB); logic array block (LAB); and MegaLAB. To clarify further discussions, the term CLB will be used to refer to multi-slice structures.

Although parallel architectures may be most efficient at realizing the arithmetic for application circuits such as digital filters, modularity and cost effectiveness can be achieved through the use of a bit-serial architecture. Such architecture also allows for a more mathematically-straightforward implementation, as sample delays can be realized with simple shift registers (or, in the case of FPGAs, with flip-flops available on every slice such as represented by the registers 316A and 316B shown illustratively in FIG. 2). Fully bit-serial multiplier architectures are generally easily place-able due to their modularity, having a reduced I/O pin needs, as well as having a shorter routing distance between components.

In one approach, a hybrid multiplier topology can be used, such as using serial-parallel two's complement binary multiplication devices, utilizing simple D-latches and combinational logic. Not truly serial, such an approach is instead a hybrid serial-parallel device, using a parallel input for the multiplicand and a serial input for the multiplier, which reduces the required I/O by about $2/3$, when compared with a fully-parallel multiplier implementation. The approximate figure for I/O reduction comes from the data pins used for a fully-parallel implementation of a hybrid approach. As an illustrative example, for an 8×8-bit fully-parallel multiplier (disregarding the clocking and set/reset pins, depending on the realization), a count of multiplicand and multiplier inputs would be 8, as well as 8 pins used for product output (24 total). For a parallel-serial hybrid implementation, pin usage is 8-1-1 for the multiplier, multiplicand, and product, respectively (10 total).

FPGA technology, such as introduced by Xilinx in the mid-1980s, affords a relatively cheap, easy, and powerful way to off-load the computationally-intensive operations from a general-purpose processor circuit to dedicated hardware, which is useful such as for Digital Signal Processing (DSP) applications. For example, by distributing the computationally-intensive workload to custom-configured FPGA co-processors, a notable performance increase can be achieved as compared to using general purpose processor circuits. Some FPGA devices can include dedicated DSP hardware. Various approaches can be used to realize bit-serial multiplier arrangements that are compatible with FPGA implementation. However, the present inventors have recognized, among other things, that existing bit-serial multiplier topologies generally use a large number of flip-flops, which translates into high area utilization on the FPGA device (since slices, where a flip-flop is used but no combinational logic is required, are generally considered "occupied" and the LUTs on such slices may not be available for use in realizing other functional blocks). Since FPGAs can include two flip-flops for every logic "multi-slice," (e.g., as shown in FIG. 2 including registers 316A and 316B) metrics relating to slice counts can be used to determine whether the number of flip-flops has been reduced for bit-serial multiplier implementations when such implementations are compared to each other.

FIG. 3 illustrates generally an example of multiplication of two numbers (e.g., operands) represented as a binary multiplicand and a binary multiplier. Binary multiplication is similar to ordinary integer multiplication, with regard to the steps taken when completing a multiplication operation. In this document, a multiplicand, "A" can be represented as $(a_n, a_{n-1}, \ldots, a_1, a_0)$, and the multiplier "B" can be represented as $(b_n, b_{n-1}, \ldots, b_1, b_0)$. An illustrative example of four-bit binary multiplication is shown in FIG. 3. As shown by the example, the multiplicand, A, is multiplied by $b_0$, the least significant bit of the multiplier. This operation generates the first partial product, $pp_0$. For the next step, the least significant bit position is filled with a zero (indicated by a "•" in the figure) and A gets multiplied by $b_1$. This process continues until all of the bits in the multiplier have been exhausted [39]. At this point, the resulting partial products are added to produce the final product, indicated by "P" in the figure ($p_7, \ldots, p_0$). Bit $p_7$ can be reserved for use as a possible carry bit.

Based on the procedure shown illustratively above, when the partial products are added together, they result in the following bit breakdown for each of the eight product or result bits ($p_7, \ldots, p_0$), as seen in EQN. 1:

$$\begin{array}{cccccc}
 & & pp_0 & pp_1 & pp_2 & pp_3 \quad (1) \\
\text{Cycle } 1 & \begin{cases} p_0 = \\ p_1 = \end{cases} & a_0 b_0 \\ a_1 b_0 & + & a_0 b_1 \\
2 & \begin{cases} p_2 = \\ p_3 = \end{cases} & a_2 b_0 \\ a_3 b_0 & + & a_1 b_1 \\ + & a_2 b_1 & + & a_0 b_2 \\ a_1 b_2 & + & a_0 b_3 \\
3 & \begin{cases} p_4 = \\ p_5 = \end{cases} & & & a_3 b_1 & + & a_2 b_2 & + & a_1 b_3 \\ & & & & & a_3 b_2 & + & a_2 b_3 \\
4 & \begin{cases} p_6 = \\ p_7 = \end{cases} & & & & & & a_3 b_3 \\ & & \text{possible} & \text{carry bit}
\end{array}$$

Figure 4A:
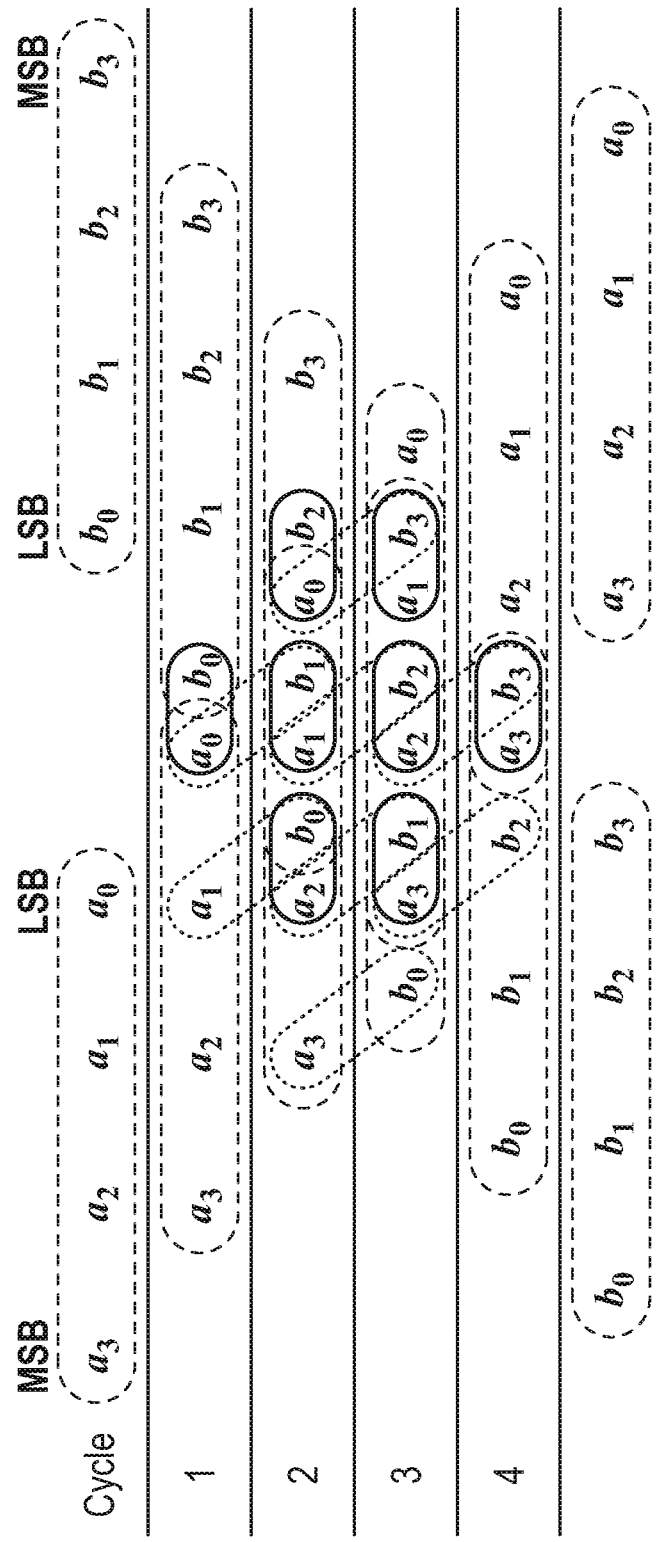
FIG. 4A illustrates generally an example of a technique for generation of a least significant bit (LSB) of two bits in a partial product that can be generated during a single clock cycle using a serial pipelining technique.
Figure 4B:
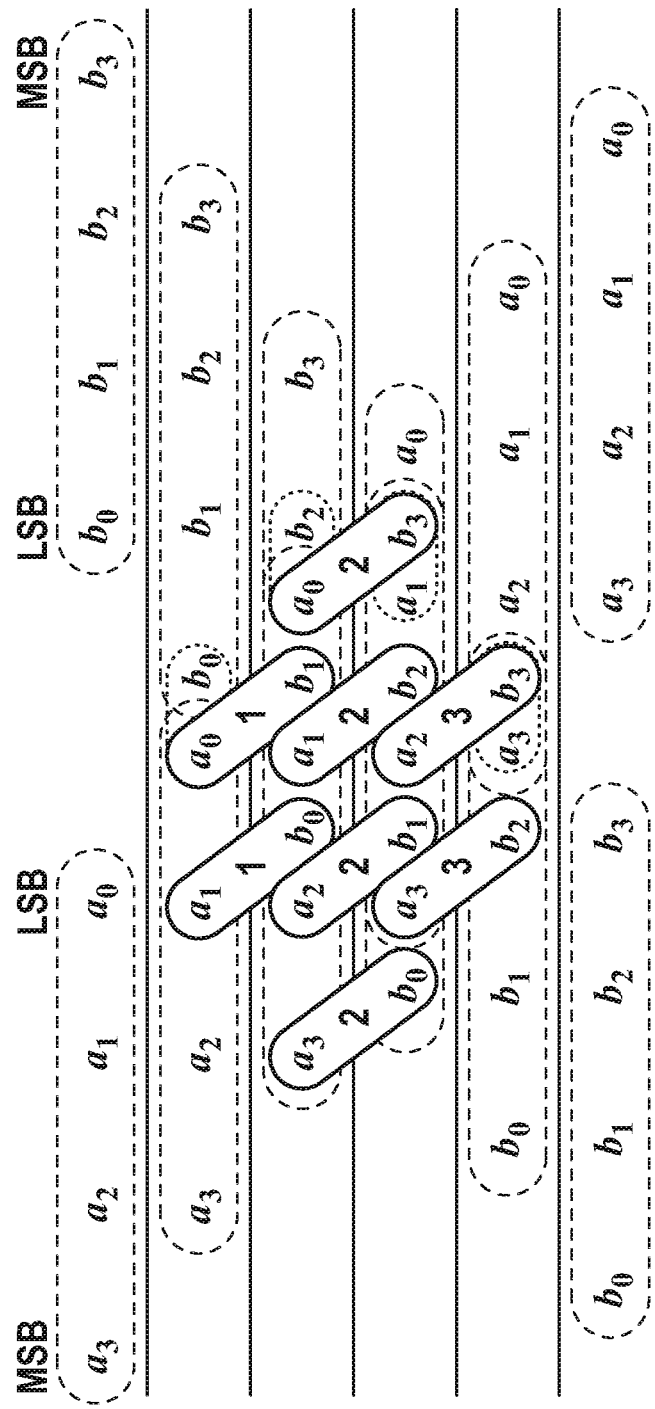
FIG. 4B illustrates generally an example of a technique for generation of a most significant bit (MSB) of the two bits in the partial product that can be generated during a single clock cycle using a serial pipelining technique.

The equation above can provide a template for a serial pipeline for data, as outlined below. By having the full product bit breakdown, it is possible to provide a hardware implementation including an efficient serial data pipeline. FIG. 4A and FIG. 4B illustrate generally how such serial pipelining can produce partial product bits, at a rate of 2 bits per every clock cycle (e.g., with clock cycle referring to a bit-clock within the circuit block of the FPGA circuit performing the bit-serial multiplication). Such partial product generation, in effect, generates an 8-bit result for a 4×4-bit multiplication in 4 cycles (with a 1 cycle latency, or time when no data is output). Positioning of AND gates on the serial pipeline can be used to produce the partial products for every final product bit position. A constraint can exist, such that all of the product bits are generated in "n" or less clock cycles for an n-by-n-bit-serial multiplication (not including any applicable latency). Such a constraint can ensure that all of the product bits are delivered in the number of clock cycles that is less than or equal to the number of final product bits present. For example, as shown above, during a first bit-clock cycle, product bits $p_0$ and $p_1$ can be provided, and during a second bit-clock cycle, product bits $p_2$ and $p_3$ can be provided, and so on.

FIG. 4A illustrates generally an example of a technique for generation of a least significant bit (LSB) of two bits in a partial product that can be generated during a single clock cycle using a serial pipelining technique. The Arabic numerals on the left-hand side of the figure (denoted by the word "Cycle" in FIG. 4A) specify the clock cycle of the operation, while the horizontal ovals surrounding groups of numbers. "$a_n b_m$" specify an AND operation. The direction in which the numbers are accepted by the multiplier is toward the right in grouping a and toward the left in grouping b.

As the counters for n and m bits are advanced by +1, an overlap of $a_n$ and $b_m$ begins to generate partial product data. The individual 2-bit partial products generated during respective clock cycles are generally summed together within the same clock cycle (using a 2-bit full adder with a delayed carry loop, as shown and described below). As an illustrative example, partial products $a_2 b_0$, $a_1 b_1$, and $a_0 b_2$ are added together using two's complement arithmetic during the second clock cycle. The diagonal ovals are explained below in relation to FIG. 4B, and can be used for generation of a most significant bit (MSB) of a partial product.

FIG. 4B illustrates generally an example of a technique for generation of a most significant bit (MSB) of the two bits in the partial product that can be generated during a single clock cycle using a serial pipelining technique. In the illustrative example of FIG. 4B, cycle numbers are marked within the AND operations themselves. A difference between LSB and MSB approaches is that one of the terms for the AND operation is retrieved from a different flip-flop device, so AND operations include terms separated diagonally in FIG. 4B. As in the example of FIG. 4A (which shows LSB generation), partial products from the same cycle are generally added together within the same cycle (e.g., $a_3 b_0$, $a_2 b_1$, $a_1 b_2$, and $a_0 b_3$ are summed during the second cycle).

Figure 5:
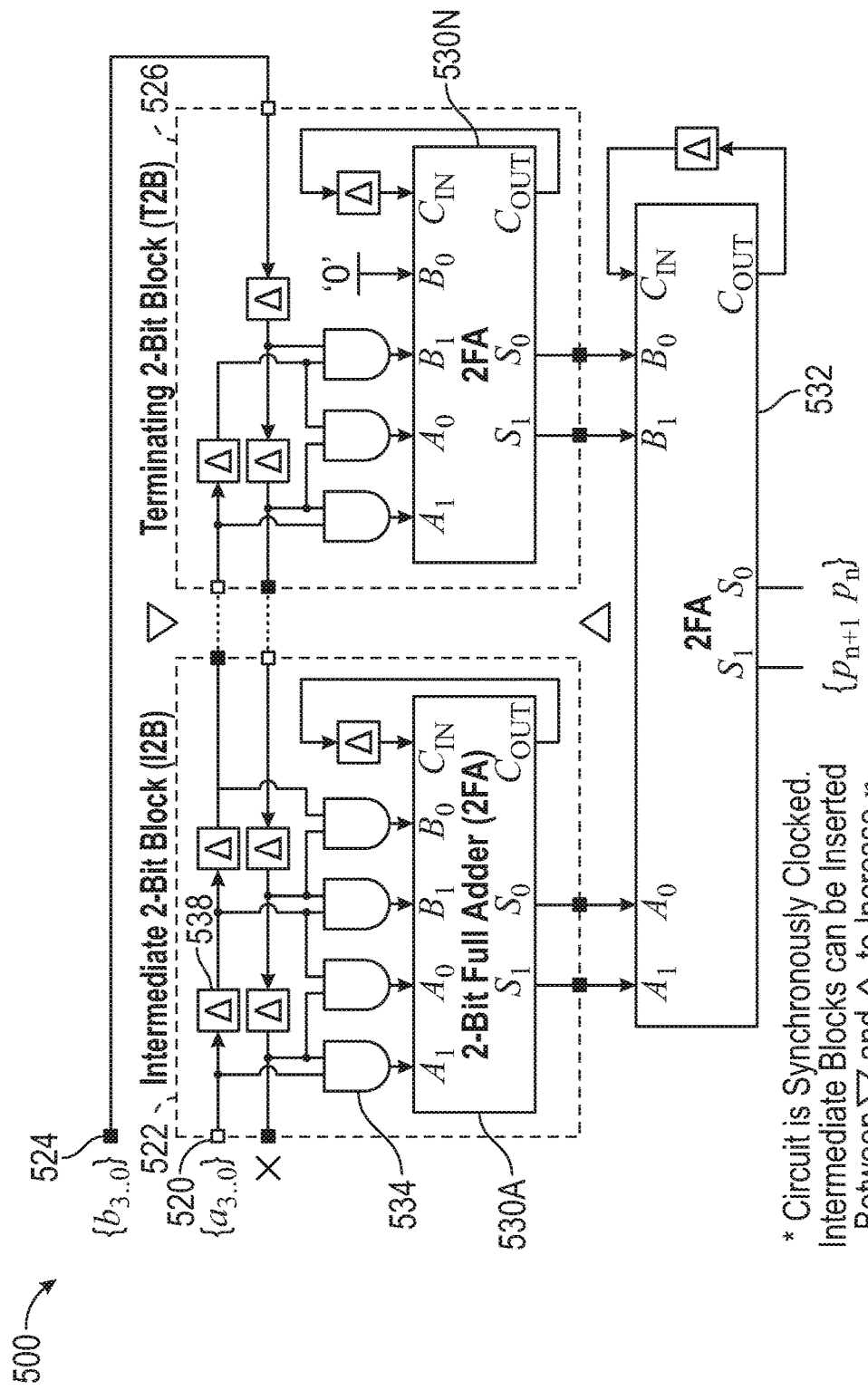
FIG. 5 illustrates generally an example of a bit-serial multiplier circuit topology (e.g., showing a four-bit multiplier, but extensible to an arbitrary number of bits, n).

FIG. 5 illustrates generally an example of a bit-serial multiplier circuit topology (e.g., showing a four-bit multiplier, but extensible to an arbitrary number of bits, n). Generally, an n-by-n-bit-serial multiplier can be implemented in hardware, such as using a logic topology as shown in the illustrative example 500 of FIG. 5. In the illustrative example of FIG. 5, a 4-bit multiplier topology is shown.

The schematic illustration in FIG. 5 can greatly reduce a count of flip-flops as compared to other approaches, due at least in part to AND gate (e.g., gate 534) positioning. The topology shown in FIG. 5 can also provide contemporaneous 2-bit addition of partial products, allowing the topology to provide partial product results (and a complete multiplication result) in fewer clock cycles as compared to other approaches. The topology shown in FIG. 5 can be subdivided into two types of serially-cascaded circuit blocks, which can then be fed into 2-bit single-carry adders (such as an adder circuit 532 shown in FIG. 5) to provide an ultimate multiplication result. The two circuit blocks can be referred to as an "intermediate" block 522 and an "end" or terminating block 526.

Referring to FIG. 5, an example of the intermediate block 522 can include an input 520 to serially receive a binary multiplicand represented as {a3,0}, and the end block 526 can include an input to serially receive a binary multiplier represented as {b3,0}. For each bit-clock cycle, the intermediate block 522 can perform a partial product determination such as using AND gates (e.g., using an AND gate 534 amongst other gates), and a 2-bit full adder circuit (2FA) 530A. Similarly, the terminating block 526 can perform a partial product determination such as using other AND gates and another 2FA circuit 530N. The topology of the intermediate block 522 provides a modular configuration that can be extended to an arbitrary number of bits. For example, the intermediate block 522 allows for the modularity of the topology and further intermediate blocks can be inserted (e.g., cascaded serially) between symbols, ▶◀, (e.g., between blocks 522 and 526) in FIG. 5 such as including (n−4)/2 instances to provide a topology capable of n-by-n-bit multiplication.

An adder tree can be provided, such as using 2-bit adders (similar to the adder circuit 532) with a single carry-bit, to sum the partial products to provide an ultimate result. Generally, a count of adders increases at a rate (n−1), while a count of flip-flops is equal to (2n−2) in addition to the (n−1) flip-flops that are a result of using a topology including a delayed carry. Delay elements in FIG. 5 (such as a register 538) are shown illustratively using blocks including the symbol, Δ. The delayed carry system allows the carry bits to propagate to the next partial product sum group. If used to sum an ultimate result in examples having more than n=4, the adder trees can be further reduced in complexity. In the example of FIG. 5, the usage of AND gates is illustrative. Other approaches can be used.

FIG. 6 illustrates generally a technique for generation of 2-bit partial product groups, such as to provide a result from multiplying a 4-bit binary multiplicand and a 4-bit binary multiplier to provide a multiplication result. A technique of breaking the partial product positions into the LSB and MSB pair is illustrated generally in FIG. 6. The Arabic numerals at the bottom of FIG. 6 (shown contained in white circles in the rendering of FIG. 6) indicate a clock cycle index during which the LSB and MSB pair (shown to each side of the Arabic numerals and shown as an oval outline including [$p_7$ $p_6$], for example) was generated. The larger dashed-rectangular areas between the lines indicate which 2-bit pairs were added during the corresponding clock cycle (where "*" signifies a "0", used as padding). An illustrative example of combinational logic that can be used to generate a 2-bit full adder circuit is shown in FIG. 7.

Figure 7:
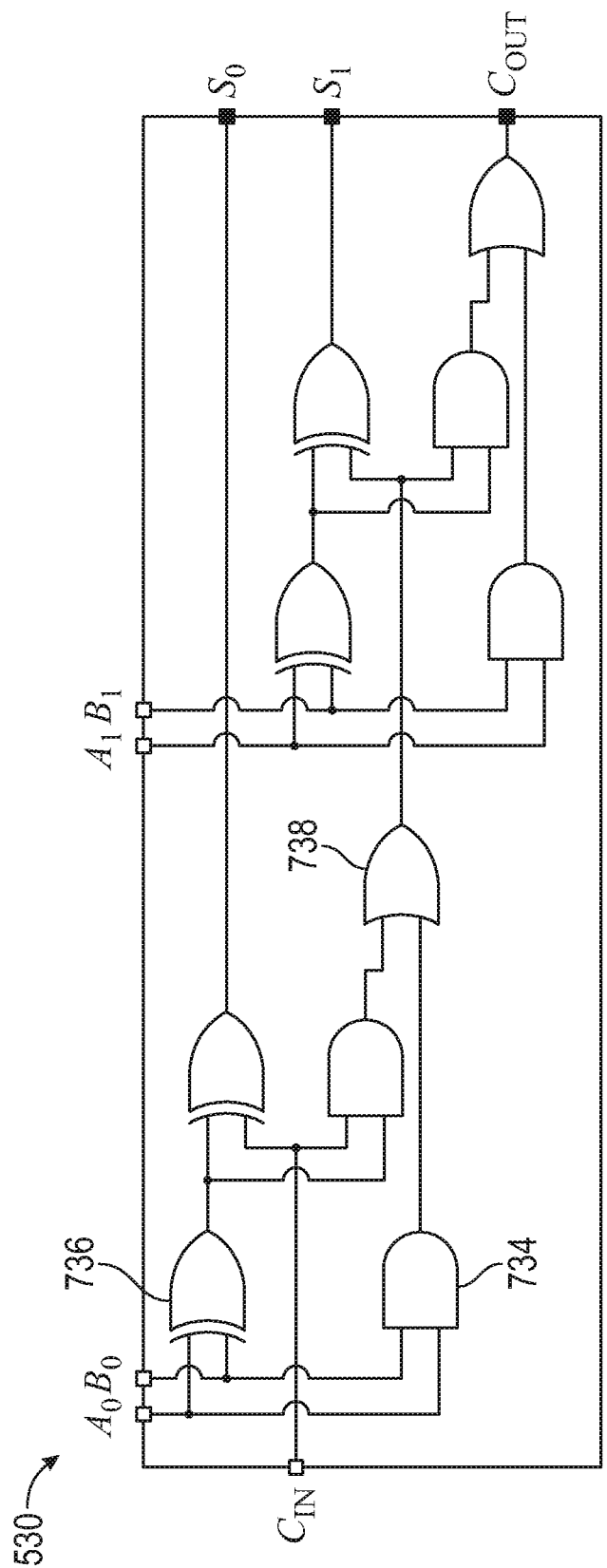
FIG. 7 illustrates generally an example comprising a 2-bit full adder circuit with 1-bit carry-in/out.

FIG. 7 illustrates generally an example comprising a 2-bit full adder circuit 530 with 1-bit carry-in/out. The 2-bit full adder circuit 530 of FIG. 7 can be provided using a combination of AND gates (such as a gate 734), exclusive OR-gates (such as an XOR gate 736) and OR gates (such as a gate 738) as shown in FIG. 7. Operands $\{A_{1,0}\}$ and $\{B_{1,0}\}$ can be provided to inputs $A_0$, $A_1$, $B_0$, $B_1$, and the resultant sum $\{S_{1,0}\}$ can be provided at an output. A carry input $C_{IN}$ and a carryout output $C_{OUT}$ can be provided.

Figure 8:
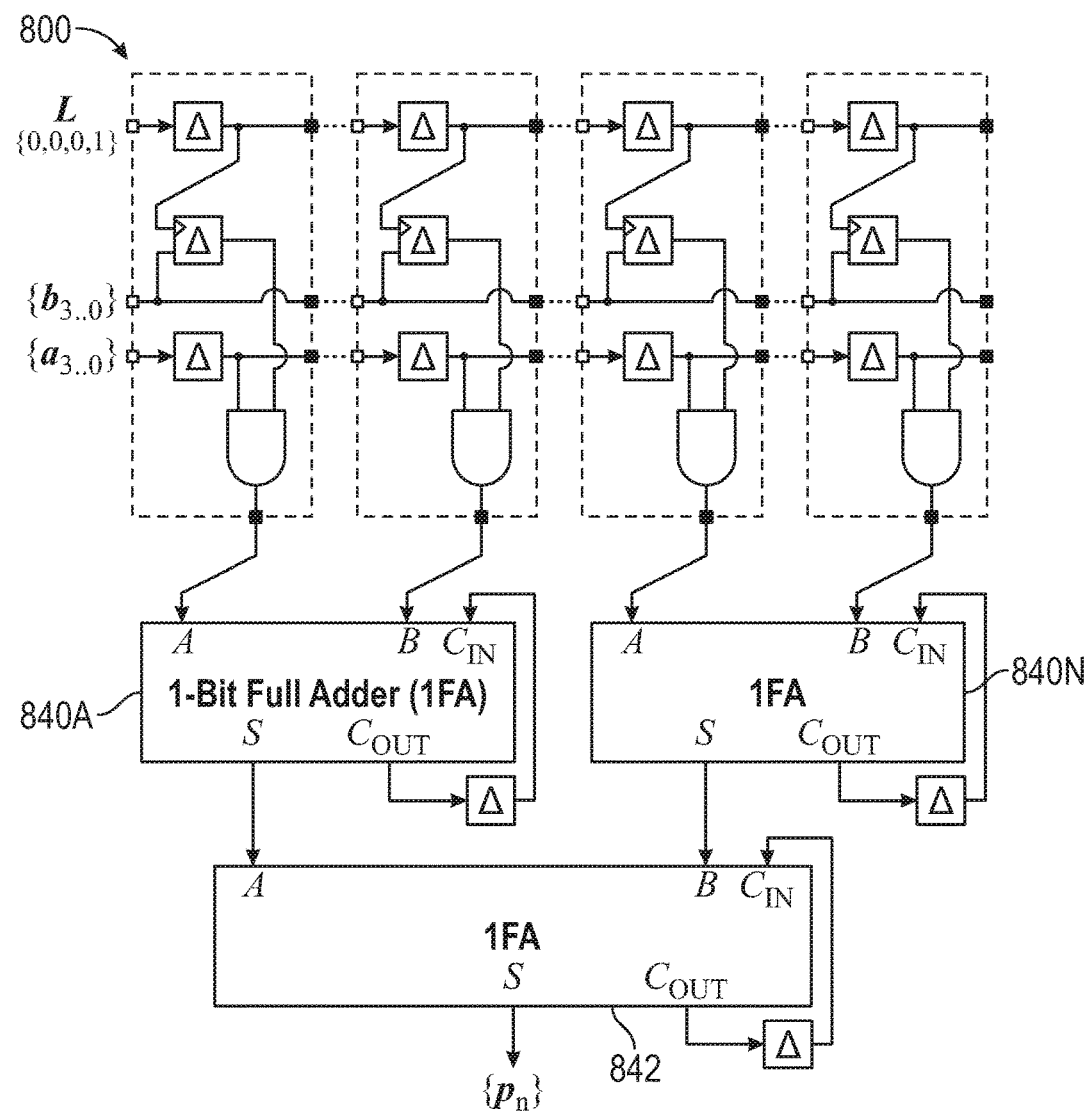
FIG. 8 shows an illustrative example of a 4-bit block of a bit-serial multiplier topology that was implemented for purposes of comparison with the topology shown in FIG. 5.

FIG. 8 shows an illustrative example 800 of a 4-bit block of a bit-serial multiplier topology that was implemented for purposes of comparison with the topology shown in FIG. 5.

The example 800 of FIG. 8 can include input logic and registers coupled to first and second 1-bit full adder circuits (1FA) 840A and 840N. Results from the 1-bit full adder circuits 840A and 840N can be summed by another 1-bit full-adder circuit 842 to provide a result comprising a product bit, $\{p_n\}$. For the illustrative example of FIG. 8, 8 full clock cycles are consumed the last bit of the product to appear at the output pin, which is twice the amount of time it takes to generate an 8-bit result of a 4×4 multiplication using the topology shown in FIG. 5. The AND gate outputs of the flip-flop chain are added by using a 1-bit full adder with a looping carry bit that is delayed by a single clock cycle. This ensures that the carry bits propagate to the next product bit position. An illustrative example of a logic diagram for a 1-bit full adder with a 1-bit carry-in/out is shown in FIG. 9.

Figure 9:
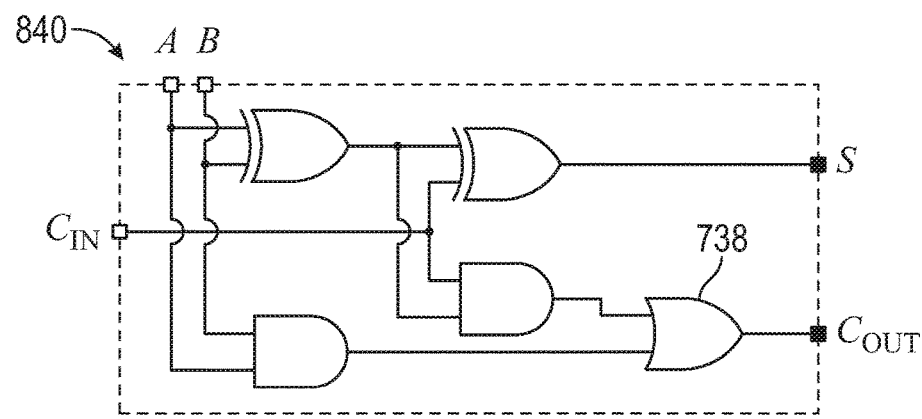
FIG. 9 illustrates generally an example comprising a 1-bit full adder with 1-bit carry-in/out.

FIG. 9 illustrates generally an example 840 comprising a 1-bit full adder with 1-bit carry-in/out, such as can be used to provide one or more 1-bit full adder circuits for the example 800 of FIG. 8.

FPGA-implemented realizations of the circuit topologies of FIG. 5 and FIG. 8 were evaluated, and FPGA resource utilization statistics were determined. When FIG. 8 is compared against FIG. 5, aside from the two sets of A and B flip-flops (8 total, represented as circuit blocks including the symbol "Δ"), there are an additional 4 flip-flop devices that are presented with a repeating binary sequence L{0, 0, . . . , 1} in the example of FIG. 8. The function of line L is to select only one pair of bits at a time, since all of the B flip-flops receive the same value of bit B $\{b_n\}$. In FIG. 8, all of the circuit elements are synchronously clocked, with the exception of the B-sequence flip-flops (shown as having inputs coupled back to the input L{0, 0, . . . , 1}.

In particular, FPGA realizations for FIG. 5 and FIG. 8 were developed in VHDL using Xilinx ISE 14.7 and Vivado 2015.4 (depending on which FPGA device was targeted). One device was targeted with ISE 14.7, to implement a 256×256 bit-serial multipliers: Spartan 6 MityDSP L138F board from CriticalLink (XC6SLX16). Three other devices were targeted with Vivado 2015.4: Virtex 7 Evaluation Board VC707 (XC7VX485T), Kintex 7 Evaluation Board KC705 (XC7K325T), and Basys3 Artix 7 Evaluation Board from Digilent (XC7A35T).

An illustrative example of FPGA mapping results corresponding to the aforementioned devices are shown illustratively in FIG. 11. To automate code generation for large-bit numbers, a script was written that generates the supporting VHDL files, given the length of the multiplicand and the multiplier. Since code generation was automated, both optimized and un-optimized versions of the designs were provided in the results. In the competing approach, hand-optimization is used to implement the realization, which is cumbersome for large-bit implementations. The device utilization did not change between the optimized and un-optimized versions of the proposed approach.

Figure 10A:
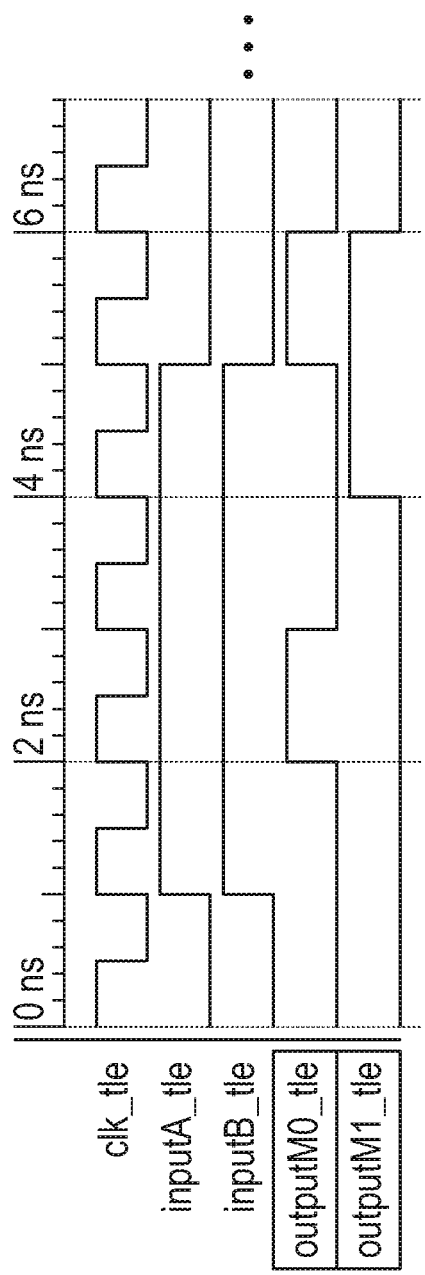
FIG. 10A shows an illustrative example including a simulated signal timing diagram for a 4×4 bit-serial multiplier implementation, such as can be obtained using the topology shown generally in FIG. 5.
Figure 10B:
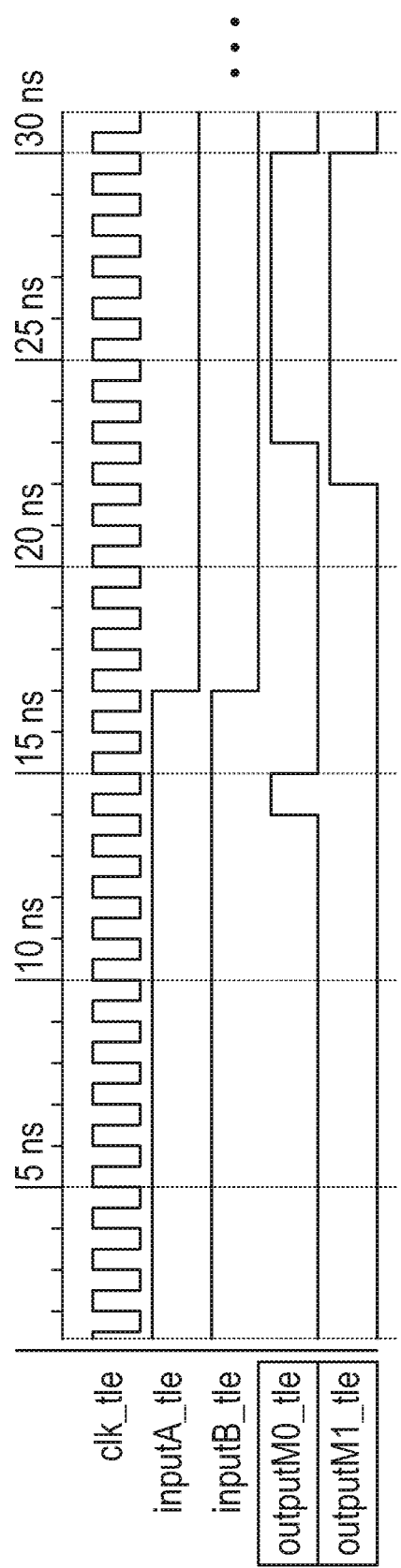
FIG. 10B shows an illustrative example including a simulated signal timing diagram for a 16×16 bit-serial multiplier implementation, such as can be obtained using the topology shown generally in FIG. 5 modified to include additional 2-bit full adder (2FA) sections.

For illustrative purposes, behavioral simulations using the waveform simulation tool in Xilinx Vivado were performed for 4×4-bit and 16×16-bit-serial multiplication operations corresponding to the topology shown in FIG. 5, and results are shown in FIGS. 10A and 10B, respectively.

FIG. 10A shows an illustrative example including a simulated signal timing diagram for a 4×4 bit-serial multiplier implementation, such as can be obtained using the topology shown generally in FIG. 5 and FIG. 10B shows an illustrative example including a simulated signal timing diagram for a 16×16 bit-serial multiplier implementation, such as can be obtained using the topology shown generally in FIG. 5 modified to include additional 2-bit full adder (2FA) sections. As shown illustratively in FIG. 10A, a 4×4-bit multiplication of numbers 0xF and 0xF was performed. As expected, the result is 0xE1 (1110 0001$_2$), given in groups of 2-bits (LSB, MSB): "10 00 01 11." The operation took a total of 4 clock cycles with a 1-bit latency. FIG. 10B shows 0xFFFF being multiplied by 0xFFFF, resulting in a product of 0xFFFE 0001 (1111 1111 1111 1110 0000 0000 0000 0001$_2$). The operation shown in FIG. 10B consumed 16 clock cycles to complete, with a 13-bit latency. Based on the behavioral simulations, the circuit latency (period, when no data is output) can be represented as (n−3), where n defines the number of bits in an n-by-n-bit-multiplication. Accordingly, a count of total cycles to complete a bit-serial multiplication using the topology shown illustratively in FIG. 5 is (2n−3).

FIG. 11 is an illustrative example comprising a table showing a comparison in FPGA resource utilization for the illustrative examples of bit-serial multiplier topologies shown in FIG. 5 (e.g., labeled "P" for Proposed) and FIG. 8 (e.g., labeled "C" for Comparative), respectively. FIG. 11 illustrates generally that when comparing un-optimized versions of the configurations of FIG. 5 and FIG. 8, the FPGA area is much larger for the comparative configuration of FIG. 8 due to LUT utilization that can stem from the number of "unique control sets." Since registers within one slice share the same control signals, only signals that share a control set may be placed within the same slice (a larger number of different control sets causes some registers to be unused or "lost"). A larger number of control sets generally causes one or more of fewer options for placement (less flexibility), higher power utilization, and lower performance. In order to make the two implementations more comparable, the comparative configuration of FIG. 8 was optimized by hand. In the hand optimization of the configuration of FIG. 8, an extra set of registers from the L line output needed to be removed at each bit position, making the implemented design smaller in terms of area, but introducing a possibility of synchronization issues. FIG. 11 also demonstrates the implementation efficiency of the proposed adder topology shown and described herein such as in relation to FIG. 5 and FIG. 6, such as by showing that hand optimization makes only a slight improvement to device area utilization.

Generally, a count of flip-flops used for the topology can be represented by the following equation, EQN. (2):

$$N_{ff} = N_{chain} + N_{adders} = (2n-2) + (n-1) = 3n-3 \quad (2)$$

A count of 2-bit full adders and AND gates can be represented by (n−1) and (2n−1), respectively. If these figures were translated into a count of transistors in an ASIC implementation (using the metric of 3p2n for XOR, 3p3n for AND, 3p3n for OR, and 2p2n for NAND), they would then equal to approximately (140n−134) transistors. For the topology shown in FIG. 8, a count of transistors is (130n−52), while the counts of flip-flops AND gates, and 1-bit full adders are equal to 4n, n, and (n−1), respectively.

An aspect of the circuit topology shown in FIG. 5 is that that only n cycles are generally used to output a result of an n-by-n-bit-serial multiplication, with a latency of (n−3) clock cycles. Such latency can be overcome by pipelining the data input to the multiplier. The implementation results have demonstrated that despite a significant decrease in the number of flip-flops and a slight drop in power consumption of the device, the combinational logic used for the 2-bit adder trees has contributed significantly to chip area utilization, potentially "wasting" precious FPGA hardware (flip-flops) within a CLB. A highly-optimized look-up table could be used, thereby reducing the amount of LUTs that are used. A Booth's recoding scheme can be used to reduce the number of adders in the addition tree by a factor of up to ⅔. Using a different type of FPGA architecture, such as a serialized architecture, may improve performance of bit-serial implementations in terms of LUT utilization. The bit-serial multiplier architecture described herein, such as shown illustratively in FIG. 5, generally outputs the product bits in a serial-parallel fashion: two bits at a time. These bits can be processed using a serialization scheme, to convert them to a fully-bit-serial output. This may also add some overhead when implemented.

Figure 12:
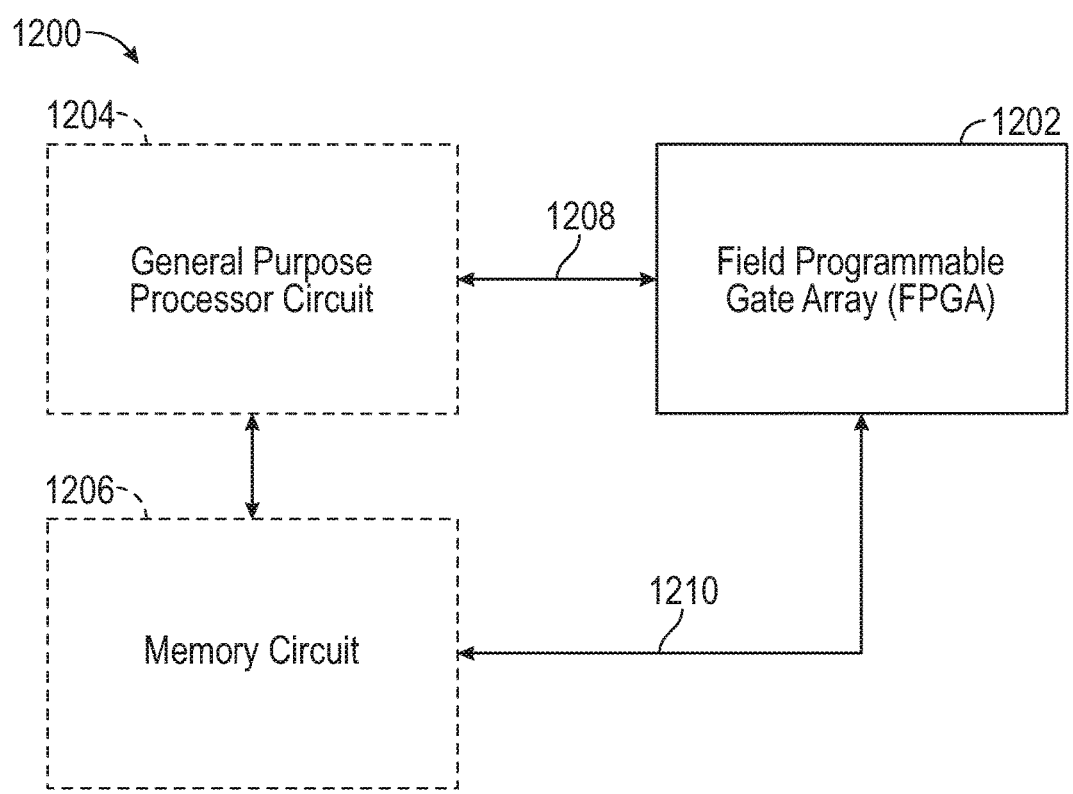
FIG. 12 illustrates generally an example of a system, such as can include an FPGA circuit, and optionally, one or more of a general-purpose processor circuit and a memory circuit.

FIG. 12 illustrates generally an example of a system 1200, such as can include an FPGA circuit 1202, and optionally, one or more of a general-purpose processor circuit 1204 and a memory circuit 1206. The memory circuit 1206 can be coupled to the FPGA circuit 1202 through a bus 1210 or other link such as to provide a vector set or other instructions to configure the FPGA 1202 to provide one or more circuit topologies shown and described elsewhere herein. In an example, the memory circuit 1206 can be included as a portion of the FPGA circuit 1202, or the FPGA circuit 1202 can include an integrated circuit having an internal memory circuit separate from the memory circuit 1206. The general-purpose processor circuit 1204 can be coupled to the memory circuit 1206, such as to execute instructions that cause the general-purpose processor circuit 1204 to perform one or more tasks such as signal processing, encryption, or decryption as illustrative examples. The general-purpose processor circuit 1204 can be coupled to the FPGA 1202 such as using bus 1208 or other link, such as to offload operations on the FPGA circuit 1202. For example, the FPGA circuit 1202 can be configured to provide a bit-serial multiplication facility using one or more techniques or circuits as shown and described elsewhere herein. The general-purpose processor circuit can provide a multiplicand and a multiplier to the FPGA circuit 1202, such as serially, and the FPGA circuit 1202 can provide a result. Such results can include product bits determined contemporaneously while still serially receiving a portion of the multiplicand or the multiplier. In this manner, such as due to enhanced efficiency in performing bit-serial multiplication, the FPGA circuit 1202 can enhance operational efficiency of a task performed by the general-purpose processor circuit 1204.

The example of FIG. 12 shows the general-purpose processor circuit 1204 as being separate from the FPGA circuit 1202. In an example, the FPGA circuit 1202 can be configured to provide a general-purpose processor circuit internally, along with a specialized circuit, such as can include a bit-serial multiplier circuit.

FIG. 13 illustrates generally an example of a portion of a system 1300, such as can implement a data serialization scheme where a general purpose processor circuit (e.g., a processor 1304) can provide a binary multiplicand and a binary multiplier to provide a multiplication result to one or more FPGA-implemented multiplier circuits 500A or 500B, and the general purpose processor circuit can receive results from the one or more FPGA-implemented multiplier circuits. By using two multiplier circuits 500A and 500B in parallel, it is possible to reduce or eliminate an effect of latency on a count of cycles consumed in generation of a final multiplication result. The illustrative example of FIG. 13 was implemented on CriticalLink's MityDSP L138F board, which contains a TI OMAP-L138 dual core application processor (AP) and a Xilinx Spartan 6 XC6SLX16 FPGA. Two 2-bit serial lines were used for communication between the AP and FPGA: one for transmitting the multiplicand and multiplier (TX) (e.g. a channel 1310A) and one for receiving a 2-bit product bit (RX) (e.g., a channel 1310B).

A latency duration can be defined as a period when the multiplier receives data, but no product bits are yet provided. When the multiplier and multiplicand bits have propagated, the final product bits are output in the "results" stage as indicated graphically in FIG. 13. These product bits can be staggered (e.g., results are obtained from multiplier #1 500A while waiting for result from multiplier #2 and vice versa), such as resulting in a constant or at least more efficient data exchange, and reducing or eliminating idleness of the FPGA. In another approach, such as including a greater count of bit-serial multipliers (e.g., for performing matrix multiplications). GPIO pins and free FPGA IO bank pins can be used for communication at a rate of four pins per every two multipliers, according to an illustrative example. If a communications bus is present, the data can be concatenated by the AP. For example, using two 32-bit buses would allow up to 16 bit-serial multipliers to be implemented using the hardware mentioned above in this illustrative example. It is also possible to provide a queuing technique for a larger count of bit-serial multipliers.

VARIOUS NOTES

Each of the non-limiting aspects above can stand on its own, or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system, comprising:
a general-purpose processor circuit; and
a field-programmable gate array (FPGA) circuit coupled to the general-purpose processor circuit to serially receive a binary multiplicand and a binary multiplier and to provide a result of a bit-serial multiplication performed on the binary multiplicand and the binary multiplier;
wherein the FPGA circuit is configured to perform the bit-serial multiplication using a bit-serial multiplication circuit, the performing the bit-serial multiplication including:
serially receiving the binary multiplicand;
serially receiving the binary multiplier; and
contemporaneously during the serially receiving, providing two bits comprising the least significant bit and the second least significant bit of the result of the multiplication.

2. The system of claim 1, wherein the FPGA circuit is configured to perform the bit-serial multiplication including completing a bit-serial multiplication of the binary multiplicand and the binary multiplier after at most n bit-clock cycles not including a latency of n−3 bit-clock cycles, where n defines a count of bits in the binary multiplicand and the binary multiplier.

3. The system of claim 1, wherein the bit-serial multiplication is implemented within the FPGA circuit using two or more cascaded 2-bit full adder circuits.

4. The system of claim 3, wherein the two or more cascaded 2-bit full adder circuits comprise 2-bit full adder circuit within an intermediate 2-bit block (I2B) and a 2-bit full adder circuit within a terminating 2-bit block (T2B).

5. The system of claim 4, wherein the outputs of the serially-cascaded 2-bit circuits comprise outputs coupled to the inputs of another 2-bit full adder circuit to provide a 2-bit result output.

6. The system of claim 5, wherein the 2-bit result output represents a portion of the result of the multiplication that is updated each bit-clock cycle starting with the least significant bit and the second least significant bit of the result and completing with a second most significant bit and a most significant bit of the result.

7. The system of claim 1, comprising a memory circuit including instructions that, when loaded into the FPGA circuit, configure the FPGA circuit to provide the bit-serial multiplication circuit to perform the bit-serial multiplication.

8. The system of claim 7, wherein the processor circuit is also coupled to the memory circuit.

9. The system of claim 1, wherein the processor circuit is coupled to the FPGA circuit in a manner defining two serialized channels, including a first channel to transmit a first portion of the binary multiplicand and the binary multiplier to a first bit-serial multiplier circuit within the FPGA circuit, and a second portion of the binary multiplicand and the binary multiplier to a second bit-serial multiplier circuit within the FPGA circuit.

10. The system of claim 9, wherein the first bit-serial multiplier circuit provides at least a portion of a result during a latency duration of the second bit-serial multiplier circuit and vice versa.

11. A method comprising:
    using a field-programmable gate array (FPGA) circuit configured to provide a bit-serial multiplication circuit:
    serially receiving a binary multiplicand;
    serially receiving a binary multiplier; and
    contemporaneously during the serially receiving the binary multiplicand and the binary multiplier, providing two bits comprising the least significant bit and the second least significant bit of the result of the multiplication.

12. The method of claim 11, comprising, using the FPGA circuit, performing the bit-serial multiplication including completing a bit-serial multiplication of the binary multiplicand and the binary multiplier after at most n bit-clock cycles not including the latency of at most n bit-clock cycles not including a latency of n−3 bit-clock cycles, where n defines a count of bits in the binary multiplicand and the binary multiplier.

13. The method of claim 11, wherein the bit-serial multiplication is implemented using the FPGA circuit to provide two or more cascaded 2-bit full adder circuits.

14. The method of claim 13, wherein the two or more cascaded 2-bit full adder circuits comprise 2-bit full adder circuit within an intermediate 2-bit block (I2B) and a 2-bit full adder circuit within a terminating 2-bit block (T2B); and wherein the outputs of the serially-cascaded 2-bit circuits comprise outputs coupled to the inputs of another 2-bit full adder circuit to provide a 2-bit result output.

15. The method of claim 14, comprising providing a portion of the result of the multiplication at the 2-bit result output that is updated each bit-clock cycle starting with the least significant bit and the second least significant bit of the result and completing with a second most significant bit and a most significant bit of the result.

16. The method of claim 11, loading instructions from a memory circuit into the FPGA circuit to configure the FPGA circuit to provide the bit-serial multiplication circuit to perform the bit-serial multiplication.

17. The method of claim 11, comprising transmitting a first portion of the binary multiplicand and the binary multiplier from a general-purpose processor circuit to a first bit-serial multiplier circuit within the FPGA circuit, and transferring a second portion of the binary multiplicand and the binary multiplier from the general-purpose processor circuit to a second bit-serial multiplier circuit within the FPGA circuit.

18. The method of claim 17, providing at least a portion of a result from the first bit-serial multiplier circuit during a latency duration of the second bit-serial multiplier circuit and vice versa.

19. A system, comprising:
    a means for serially receiving a binary multiplicand;
    a means for serially receiving a binary multiplier; and
    a means for contemporaneously during the serially receiving the binary multiplicand and the binary multiplier, providing two bits comprising the least significant bit and the second least significant bit of the result of the multiplication using an FPGA circuit.

20. The system of claim 19, comprising a means for receiving instructions to configure the FPGA circuit to provide a bit-serial multiplication circuit to perform the bit-serial multiplication.

* * * * *